United States Patent
Yamada et al.

(10) Patent No.: US 9,283,930 B2
(45) Date of Patent: Mar. 15, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Kazuhiro Yamada, Aichi-ken (JP); Akira Sumiyashiki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 79 days.

(21) Appl. No.: 14/182,580

(22) Filed: Feb. 18, 2014

(65) Prior Publication Data

US 2014/0239110 A1 Aug. 28, 2014

(30) Foreign Application Priority Data

Feb. 22, 2013 (JP) ................................. 2013-033337

(51) Int. Cl.
*B60R 22/40* (2006.01)
*B60R 22/405* (2006.01)

(52) U.S. Cl.
CPC ..................... *B60R 22/405* (2013.01)

(58) Field of Classification Search
CPC ...... B60R 22/40; B60R 22/46; B60R 22/405; B60R 22/34; B60R 22/36; B60R 22/38; B60R 22/41
USPC ................ 242/384.2, 382, 382.5, 384, 384.5, 242/384.6
See application file for complete search history.

(56) References Cited

U.S. PATENT DOCUMENTS

| | | | | |
|---|---|---|---|---|
| 5,826,813 | A * | 10/1998 | Hibata | B60R 22/415 242/382.6 |
| 6,318,664 | B1 * | 11/2001 | Sumiyashiki | B60R 22/40 242/379 |
| 6,352,213 | B1 | 3/2002 | Sumiyashiki et al. | |
| 2009/0096201 | A1 | 4/2009 | Hiramatsu et al. | |
| 2011/0290929 | A1 * | 12/2011 | Tatsuma | B60R 22/41 242/383.2 |
| 2014/0117138 | A1 * | 5/2014 | Egawa | B60R 22/40 242/384.2 |

FOREIGN PATENT DOCUMENTS

| | | |
|---|---|---|
| JP | 2000-302010 A | 10/2000 |
| JP | 2007-284014 A | 11/2007 |
| JP | 2011-246011 A | 8/2011 |

OTHER PUBLICATIONS

Office Action issued in a corresponding Japanese Application No. 2013-033337 on Dec. 16, 2014.

* cited by examiner

*Primary Examiner* — Sang Kim
*Assistant Examiner* — Juan Campos, Jr.
(74) *Attorney, Agent, or Firm* — Roberts Mlotkowski Safran & Cole, PC (57) ABSTRACT

In a webbing take-up device, a cut-out portion is formed in a close-off portion that closes off a pawl housing groove from a side opposite a spool body side. For this reason, the close-off portion is not formed in a position facing ratchet teeth which is at from a second ratchet tooth from a take-up direction side to the other side. Due to this, even if a head portion of a lock pawl, particularly a take-up direction side portion of the head portion, is displaced in such a way as to move away from the spool body, the head portion does not come into contact with the close-off portion or, even if the head portion comes into contact with the close-off portion, a force with which the head portion presses the close-off portion becomes smaller.

5 Claims, 5 Drawing Sheets

WEBBING TAKE-UP DEVICE

CROSS-REFERENCE TO RELATED APPLICATION

This application claims priority under 35 USC 119 from Japanese Patent Application No. 2013-033337, filed Feb. 22, 2013, the disclosure of which is incorporated by reference herein.

BACKGROUND

1. Field of the Invention

The present invention relates to a webbing take-up device that configures a seat belt device in a vehicle.

2. Related Art

In a webbing take-up device disclosed in Japanese Patent Application Laid-Open (JP-A) No. 2011-246011 as an example, ratchet teeth formed on a lock pawl (which is called a lock plate in JP-A No. 2011-246011) that configures a lock mechanism mesh with ratchet teeth of a ratchet hole formed in a leg plate of a frame, whereby the rotation of a spool in a pull-out direction can be regulated.

When the spool tries to rotate in the pull-out direction in a state in which the ratchet teeth of the lock pawl are meshed with the ratchet teeth of the ratchet hole, a section of the lock pawl in which section the ratchet teeth are formed, particularly the take-up direction side of this section, tries to move away from the spool in the axial direction of the spool. In the webbing take-up device disclosed in JP-A No. 2011-246011, a portion that houses the lock pawl is integrally formed on the spool, and a side of the portion that houses the lock pawl, opposite a body portion side of the spool, is closed off. This close-off portion is pressed by the lock pawl as a result of the lock pawl trying to move away as described above.

SUMMARY

In consideration of the above-described circumstances, the present invention to obtain a webbing take-up device that can prevent or reduce pressing of a lock pawl to a close-off portion of a lock pawl housing portion when the lock pawl is meshed with ratchet teeth of a ratchet hole in a frame.

A webbing take-up device pertaining to a first aspect of the invention includes: a frame at which is formed a ratchet hole having inner ratchet teeth; a spool that has a spool body that takes up a webbing by rotating in a take-up direction; a lock pawl that is provided at a lateral side of the spool body in an axial direction of the spool and that has a head portion at which are formed a plurality of outer ratchet teeth corresponding to the ratchet teeth of the ratchet hole and a tail portion that extends from a pull-out direction side of the head portion; a lock base that is formed at the spool at the lateral side of the spool body in the axial direction and at which is formed a pawl housing groove that houses the lock pawl inside the pawl housing groove and opens at a head portion side at an outer peripheral portion of the lock base; a sensor mechanism that, by being actuated, causes the lock pawl to move in a lock direction so that the ratchet teeth of the head portion mesh with the ratchet teeth of the ratchet hole to thereby regulate rotation of the spool in the pull-out direction; and a close-off portion that closes off the pawl housing groove from a side of the lock base opposite to the spool body side and at which a cut-out portion is formed so as to face a second located ratchet tooth from the take-up direction side and a ratchet tooth (teeth) located further toward the other side than the second located ratchet tooth, among the plurality of ratchet teeth of the lock pawl.

In the webbing take-up device pertaining to the first aspect, the lock pawl housed in the pawl housing groove in the lock base formed on the spool moves in the lock direction when the sensor mechanism is actuated. The head portion of the lock pawl that has moved in this way moves toward the inner peripheral portion of the ratchet hole formed in the frame, and the ratchet teeth formed on the head portion mesh with the ratchet teeth formed on the inner peripheral portion of the ratchet hole. When the ratchet teeth of the lock pawl mesh with the ratchet teeth of the ratchet hole in this way, the rotation of the lock pawl in the pull-out direction is regulated, and in accompaniment with this, the rotation of the spool in the pull-out direction is regulated. Due to the rotation of the spool in the pull-out direction is regulated, the pulling-out of the webbing from the spool body is regulated and the body of an occupant can be effectively restrained by the webbing.

When the spool, and the lock pawl, tries to rotate in the pull-out direction in the state in which the ratchet teeth of the lock pawl are meshed with the ratchet teeth of the ratchet hole in this way, the head portion of the lock pawl, particularly the pull out direction side portion of the head portion, tries to shift position thereof toward the side opposite the spool body side. Here, the cut-out portion is formed in the close-off portion that closes off, from the side opposite the spool body side, the pawl housing groove in which the lock pawl is housed, and the cut-out portion faces the second located ratchet tooth from the take-up direction side and the ratchet tooth (teeth) located further toward the other side than the second located ratchet tooth, among the plurality of ratchet teeth of the lock pawl. For this reason, even if the head portion of the lock pawl, particularly the pull out direction side potion of the head portion, is displaced toward the side opposite the spool body side, this portion does not come into contact (abut) with the close-off portion or if it does, the range of contact is small. For this reason, even in such a case as this, the close-off portion does not receive a pressing force from the lock pawl.

In a webbing take-up device pertaining to a second aspect of the invention, in the first aspect, the close-off portion is formed so as to face, in the axial direction, a vicinity of an end portion at the take-up direction side of the head portion, an inner wall at the take-up direction side of the pawl housing groove is formed so as to be able to abut the lock pawl, and the close-off portion facing the vicinity of the end portion at the take-up direction side of the head portion and the inner wall at the take-up direction side of the pawl housing groove abut the lock pawl and guide the lock pawl in the lock direction.

In the webbing take-up device pertaining to the second aspect, the close-off portion is formed in such a way as to face, in the axial direction of the spool, the vicinity of the end portion on the take-up direction side of the head portion of the lock pawl. Furthermore, in the webbing take-up device pertaining to the second aspect, the inner wall on the take-up direction side of the guide groove is formed in such a way that it can contact the lock pawl.

When the sensor mechanism is actuated and the lock pawl tries to move, the close-off portion facing the vicinity of the end portion on the take-up direction side of the head portion of the lock pawl and the inner wall on the take-up direction side of the guide groove abut the lock pawl and guide the lock pawl in the lock direction. Due to this, the lock pawl can be prevented or suppressed from moving in a direction other than the lock direction, and as a result the ratchet teeth of the lock pawl can mesh well with the ratchet teeth of the ratchet hole.

In a webbing take-up device pertaining to a third aspect of the invention, in the first aspect or the second aspect, a shaft portion is formed at the lock base, coaxially with the spool body, from the side of the lock base opposite to the spool body side, and the pawl housing groove is curved so as to avoid a region in which the shaft portion is formed.

In the webbing take-up device pertaining to the third aspect, the shaft portion is formed coaxially with the spool body from the side of the lock base opposite the spool body side. Here, in the webbing take-up device pertaining to the third aspect, the pawl housing groove is curved in such a way as to avoid the range in which the shaft portion is formed. For this reason, the shaft portion is continuous with the spool body in the axial direction of the spool body. Due to this, the mechanical strength of the shaft portion can be improved.

In a webbing take-up device pertaining to a fourth aspect of the invention, in any of the first aspect to the third aspect, the webbing take-up device further includes: an abut surface that is set at an inside surface of the pawl housing groove, that abuts a portion of a side surface of the lock pawl, which portion is further than a middle portion in the axial direction toward the spool body side, in a state in which the ratchet teeth of the lock pawl are meshed with the ratchet teeth of the ratchet hole, that imparts a rotational force of the spool in the pull-out direction to the lock pawl, and that receives a reaction force corresponding to the rotational force; and a recessed portion that is formed between the abut surface and the close-off portion and that is formed in a recessed shape that opens inward in an open width direction of the pawl housing groove, the recessed portion having a curved surface that is curved so as to open inward in the open width direction of the pawl housing groove.

In the webbing take-up device pertaining to the fourth aspect, the abut surface(s) is (are) set on the inside surface(s) of the pawl housing groove. The abut surface abuts the portion of the side surface of the lock pawl, which portion is further than the middle portion in the axial direction toward the spool body side, in the state in which the ratchet teeth of the lock pawl are meshed with the ratchet teeth of the ratchet hole. Moreover, when the spool tries to rotate in the pull-out direction in this state, the abut surface impart this rotational force to the lock pawl and try to cause the lock pawl to rotate in the pull-out direction. In a state in which the ratchet teeth of the lock pawl are meshed with the ratchet teeth of the ratchet hole, the rotation of the lock pawl in the pull-out direction is regulated. For this reason, the abut surface receives a reaction force corresponding to the rotational force in the pull-out direction.

Here, the recessed portion(s) with the recessed shape is(are) formed between the abut surface(s) and the close-off portion. The recessed portion has the curved surface that opens inward in the open width direction of the pawl housing groove, and when the lock pawl has pressed the close-off portion, the load imparted from the lock pawl is dispersed by the curved surface of the recessed portion without concentrating in a particular place. Due to this, in the webbing take-up device pertaining to the fourth aspect, the influence by the pressing force from the lock pawl on the close-off portion and so forth can be reduced or prevented even while the load from the lock pawl is received by the abut surface.

In a webbing take-up device pertaining to a fifth aspect of the invention, in the fourth aspect, at least a part of a guide surface that guides the lock pawl in the lock direction when the sensor mechanism is actuated is used as the abut surface.

In the webbing take-up device pertaining to the fifth aspect, the guide surface(s) is(are) set on the inside surface(s) of the pawl housing groove, and the side surface of the lock pawl abuts the guide surface. When the sensor mechanism has been actuated, the lock pawl is guided on the guide surface and moves in the lock direction so that the ratchet teeth of the lock pawl mesh with the ratchet teeth of the ratchet hole.

Here, at least part of the guide surface is used as the abut surface. For this reason, in the webbing take-up device pertaining to the fifth aspect, the influence by the pressing force from the lock pawl on the close-off portion and so forth can be reduced or prevented even while the lock pawl is guided by the guide surface.

As described above, the webbing take-up device pertaining to the present invention can prevent or reduce pressing from a lock pawl to a close-off portion of a lock pawl housing portion in a state in which the lock pawl is meshed with ratchet teeth of a ratchet hole.

BRIEF DESCRIPTION OF THE DRAWINGS

An embodiment of the invention will be described in detail with reference to the following figures, wherein.

DETAILED DESCRIPTION

<Configuration of Embodiment>

Figure 1:
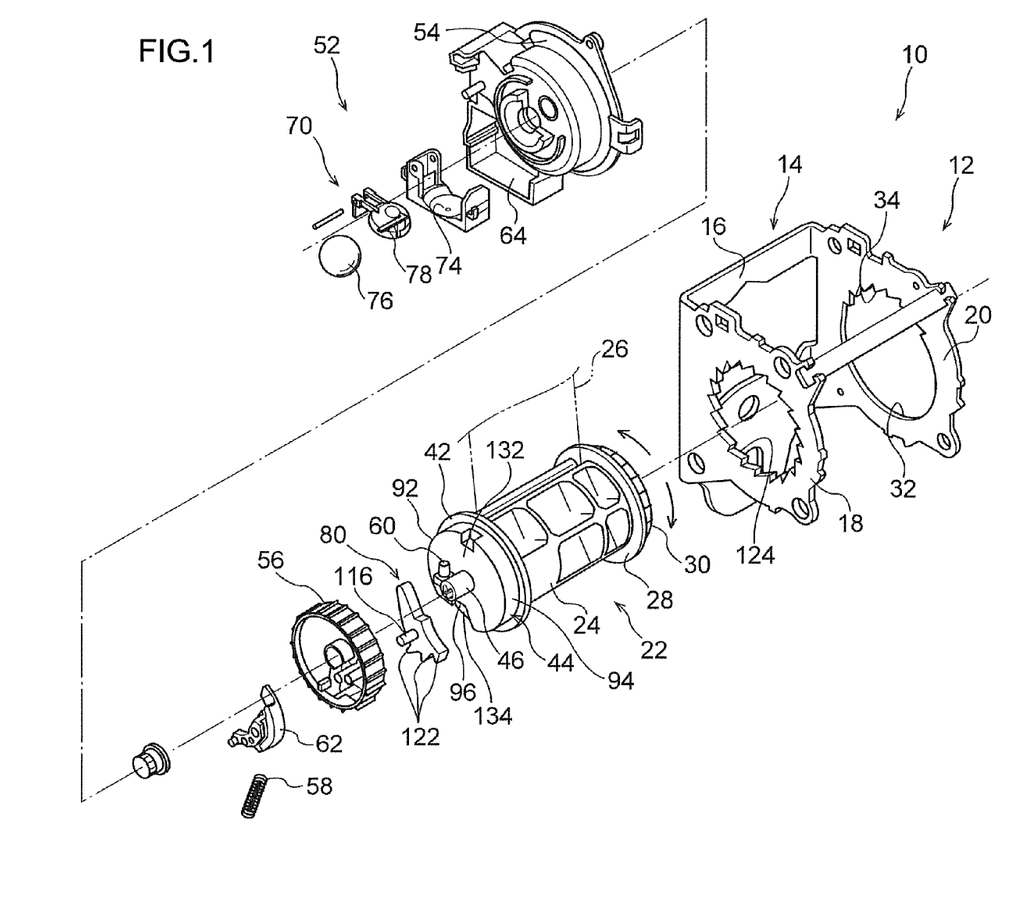
FIG. 1 is an exploded perspective view schematically showing the configuration of a webbing take-up device pertaining to the embodiment of the invention.

In FIG. 1, an outline of the overall configuration of a webbing take-up device 10 pertaining to an embodiment of the invention is shown by way of an exploded perspective view.

As shown in FIG. 1, a device body 12 of the webbing take-up device 10 has a frame 14. The frame 14 has a plate-like back plate 16. A leg plate 18 extends from one width direction end of the back plate 16 toward one thickness direction side of the back plate 16, and a leg plate 20 extends from the other width direction end of the back plate 16 toward one thickness direction side of the back plate 16 (i.e., the same direction in which the leg plate 18 extends from the back plate 16). For this reason, the frame 14 is formed in a substantially square U-like shape overall, and the back plate 16 of the frame 14 is directly or indirectly fixed, for example, to a skeletal member or reinforcement member configuring a vehicle body on the rear side of a rear seat in a vehicle.

Furthermore, the device body 12 has a spool 22. The spool 22 has a spool body 24 provided between the leg plate 18 and the leg pate 20. The spool body 24 has a cylindrical shape whose central axis direction lies along the direction in which the leg plate 18 and the leg plate 20 oppose one another, and with respect to the outer peripheral portion of the spool body 24, appropriately lightening is performed for weight reduction. A lengthwise direction base end side of a long band-like webbing 26 is anchored to the spool body 24, and when the spool body 24 rotates one way about its central axis, the webbing 26 is taken up in layers onto the outer peripheral portion of the spool body 24.

A flange portion 28 whose outer diameter dimension is larger than the outer diameter dimension of the spool body 24 is formed coaxially with the spool body 24 on the end portion on the leg plate 20 side of the spool body 24. An outer-toothed ratchet portion 30 is formed coaxially with the spool body 24 on the side of the flange portion 28 opposite the spool body 24 side. The ratchet portion 30 is positioned on the inside of a hole portion 32 formed in the leg plate 20. Inner ratchet teeth 34 are formed on the section of the inner peripheral portion of the hole portion 32 on the side in the direction in which the webbing 26 is pulled out from the spool body 24.

When, as a result of the webbing 26 being pulled, the spool body 24 is displaced toward the side in the direction in which the webbing 26 is pulled while the spool body 24 rotates in a pull-out direction opposite a take-up direction, the ratchet portion 30 meshes with the ratchet teeth 34 of the hole portion 32. Due to this, the rotation of the spool body 24 in the pull-out direction on the leg plate 20 side of the spool body 24 is regulated. A shaft portion (not shown in the drawings) is formed coaxially with the spool body 24 on the side of the ratchet portion 30 opposite the flange portion 28 side.

The shaft portion is inserted into the inside of a spring case (not shown in the drawings) provided on the outside of the leg plate 20 (i.e., the side of the leg plate 20 opposite the leg plate 18 side), and the shaft portion is rotatably supported directly or indirectly in the spring case. A spiral spring is provided on the inside of the spring case. The spiral spring is tightened as a result of the shaft portion and further the spool 22 rotating in the pull-out direction and urges, with its urging force, the spool 22 in the take-up direction. The webbing 26 is taken up onto the spool 22 as a result of the spool 22 rotating in the take-up direction due to this urging force.

Furthermore, a flange portion 42 whose outer diameter dimension is larger than the outer diameter dimension of the spool body 24 is formed coaxially with the spool body 24 on the end portion on the leg plate 18 side of the spool body 24. A lock base 44 is formed on the side of the flange portion 42 opposite the spool body 24 side, and a shaft portion 46 is formed coaxially with the spool body 24 and projecting from the surface of the lock base 44 on the side opposite the flange portion 42 side.

A sensor mechanism 52 is provided on the leg plate 18 on the outside of the leg plate 18 (i.e., on the side of the leg plate 18 opposite the leg plate 20 side). The sensor mechanism 52 has a sensor holder 54. The sensor holder 54 is attached to the leg plate 18 on the outside of the leg plate 18 (i.e., on the side of the leg plate 18 opposite the leg plate 20 side). The sensor holder 54 is formed in a substantially bowl-like (concave) shape that opens toward the leg plate 18 side. The aforementioned shaft portion 46 is inserted in the sensor holder 54, whereby the shaft portion 46 and further the spool 22 are rotatably supported in the sensor holder 54.

A V gear 56 is provided on the inside of the sensor holder 54. The V gear 56 is rotatably supported on the shaft portion 46. One end of a compression coil spring 58 is anchored to the V gear 56. The other end of the compression coil spring 58 is anchored to an anchor projection portion 60 formed on the surface of the aforementioned lock base 44 on the side opposite the flange portion 42 side. For this reason, the V gear 56 is rotatably supported on the shaft portion 46 as described above, but when the spool 22 rotates in the pull-out direction, for example, the compression coil spring 58 compressed by this rotation urges the V gear 56 in the pull-out direction, and the V gear 56 rotates in the pull-out direction following the spool 22 due to this urging force.

A W pawl 62 that configures a WSIR mechanism is provided on the side of the V gear 56 opposite the leg plate 18 side. The W pawl 62 is supported on the V gear 56 in a position away from the rotational center of the V gear 56 in the radial direction thereof in such a way that the W pawl 62 can swing about a shaft whose axial direction has the same orientation as the central axis of the V gear 56. The W pawl 62 is urged in the pull-out direction by an urging member such as a torsion coil spring (not shown in the drawings). However, when, as a result of the V gear 56 rotating in the pull-out direction due to a rotational acceleration equal to or greater than a predetermined magnitude, the W pawl 62 trying to remain in its position due to inertia resultantly swings relatively in the take-up direction with respect to the V gear 56, the W pawl 62 meshes with ratchet teeth (not shown in the drawings) formed on the inside of the sensor holder 54. Due to this, the rotation of the V gear 56 in the pull-out direction is regulated (which is an actuated state of the WSIR mechanism).

Furthermore, a sensor housing portion 64 that opens toward the side opposite the leg plate 18 side is formed on the side of the sensor holder 54 under the position where the V gear 56 is disposed, and an acceleration sensor 70 that configures a VSIR mechanism is provided on the inside of the sensor housing portion 64. The acceleration sensor 70 has a sensor housing 72.

The sensor housing 72 has a concave surface 74 that opens upward, and a spherical ball 76 is placed on the concave surface 74. On the upper side of the ball 76, a sensor lever 78 is supported on the sensor housing 72 in such a way as to be rotatable in an up and down direction. When the ball 76 moves due to inertia and rises on the concave surface 74 as a result of the vehicle suddenly decelerating, the ball 76 presses the sensor lever 78 from below and causes the lever 78 to rotate upward. The distal end side of the sensor lever 78 that has rotated in this way engages with a ratchet gear formed on the outer peripheral portion of the V gear 56 and regulates the rotation of the V gear 56 in the pull-out direction (which is an actuated state of the VSIR mechanism).

In this way, when the spool 22 rotates in the pull-out direction in a state in which the WSIR mechanism, the VSIR mechanism has been actuated (i.e., a state in which the rotation of the V gear 56 in the pull-out direction is regulated), the compression coil spring 58 becomes compressed and relative rotation of the spool 22 in the pull-out direction with respect to the V gear 56 occurs. When this relative rotation of the spool 22 in the pull-out direction with respect to the V gear 56 occurs, a lock pawl 80 that configures a lock mechanism is actuated.

Figure 2:
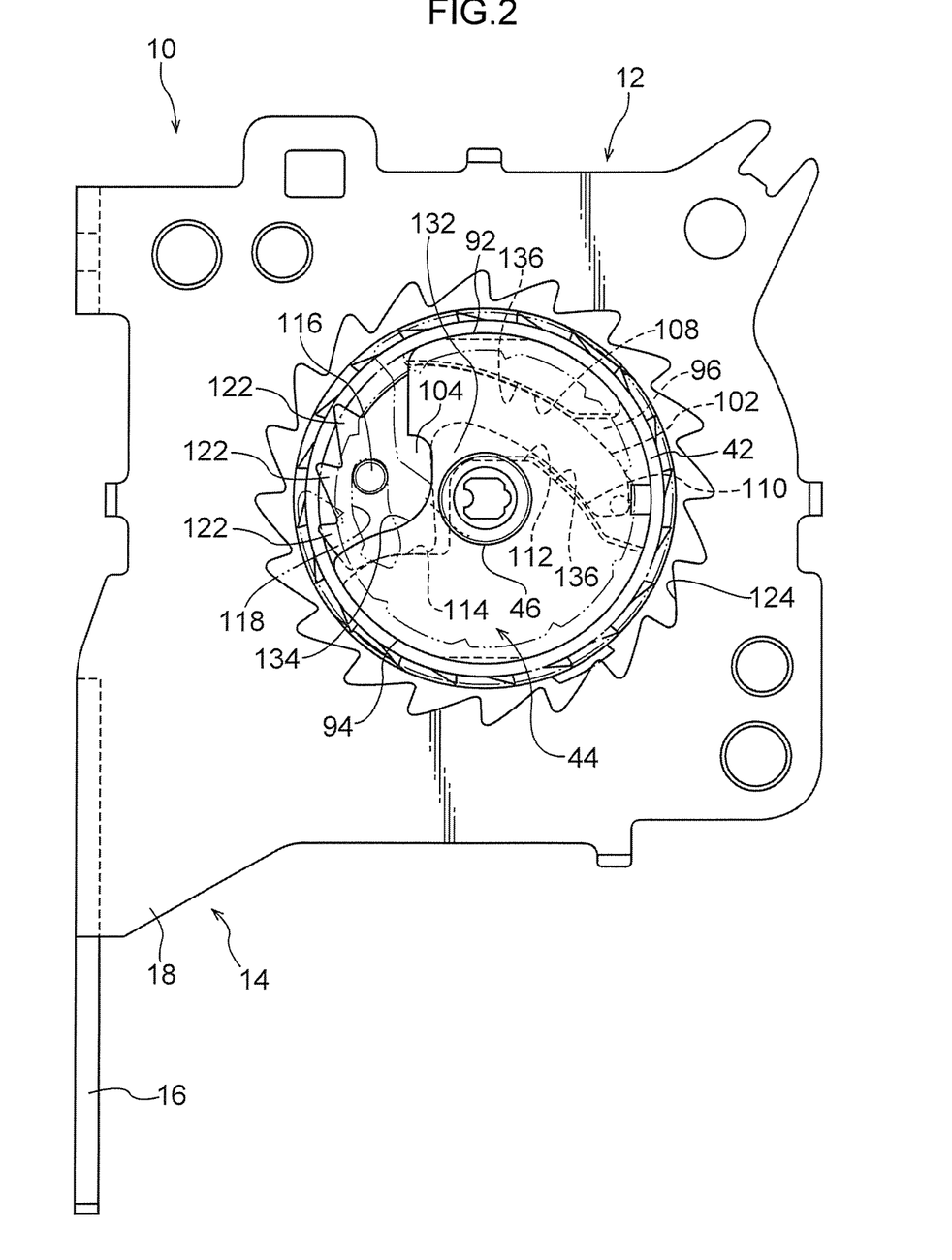
FIG. 2 is a side view showing a lock base as seen from a side opposite a spool body side.
Figure 4:
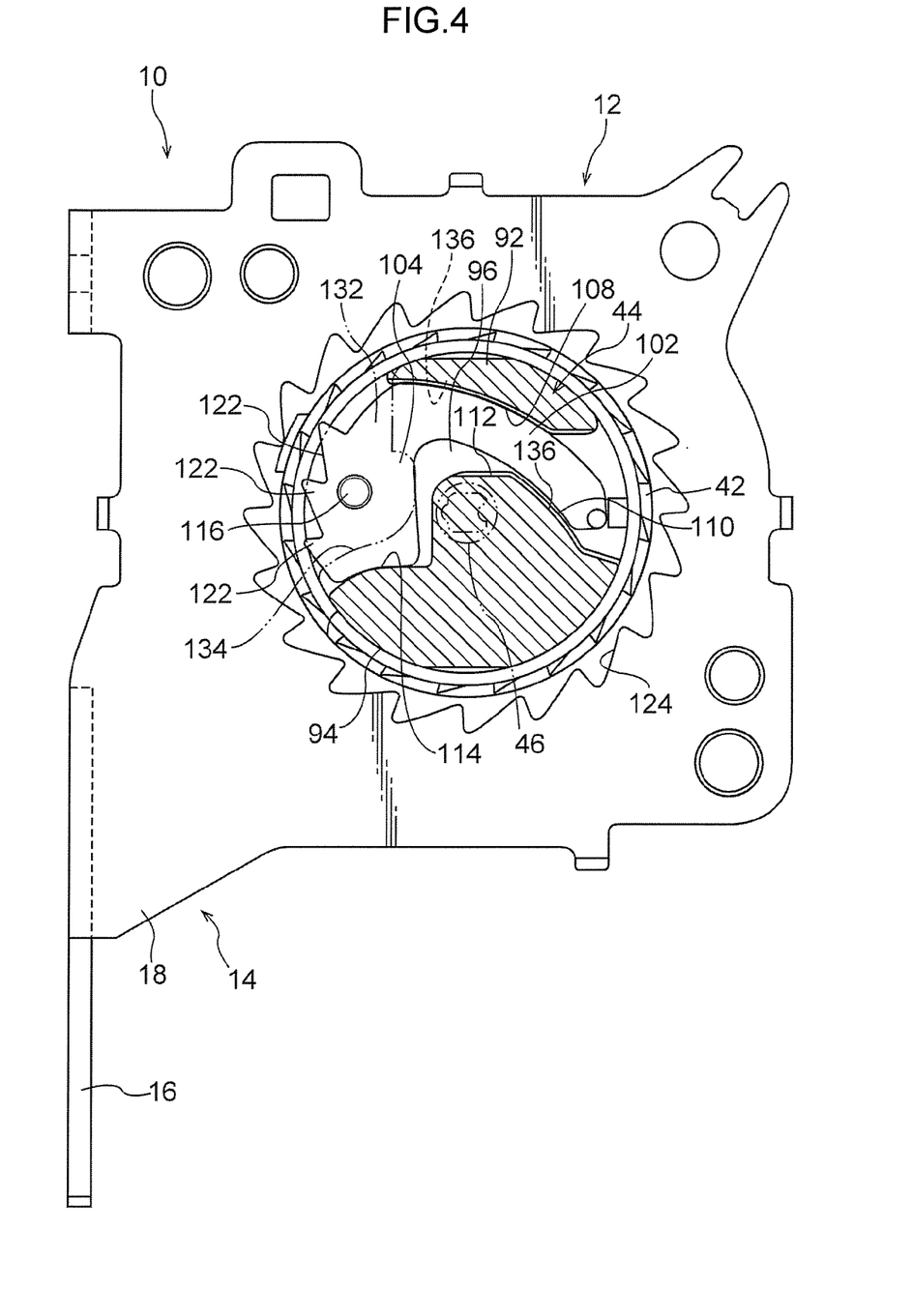
FIG. 4 is a cross-sectional view in which a lock base is cut on the spool body side of a close-off portion.

The lock pawl 80 is provided at the lock base 44. As shown in FIG. 2 and FIG. 4, the lock base 44 has side portions 92 and 94. A pawl housing groove 96 is a portion between the side portion 92 and the side portion 94, and most of the lock pawl 80 is housed inside of the pawl housing groove 96. The lock pawl 80 has a narrow width plate-like tail portion 102. The longitudinal direction tail portion 102 is gently curved about an axis whose axial direction has the same orientation as the central axis of the spool 22, and the longitudinal direction distal end side of the tail portion 102 is bent or curved toward the take-up direction side. A plate-like head portion 104 is formed on the distal end of the tail portion 102, so the lock pawl 80 is formed in a generally V-like shape overall.

The aforementioned side portion 92 opposes (faces) one width direction end of the tail portion 102 of the lock pawl 80. The surface on the tail portion 102 side of the side portion 92 is a guide surface 108 serving as an abut (contact) surface. The guide surface 108 is curved in a concave shape toward the tail portion 102 side in such a way as to follow the one width direction end of the tail portion 102, which is gently curved in such a way of overhang or projecting out. The guide surface 108 is in contact with (abuts) the one width direction end of the tail portion 102 at a portion which is further toward the distal end side than a middle portion in the longitudinal direction of the tail portion 102.

The side portion 94 opposes (faces) the other width direction end of the tail portion 102. The side portion 94 has a guide surface 110 serving as an abut (contact) surface. The guide surface 110 opposes (faces) the other width direction end of the tail portion 102 at a portion which is further toward the base end side than the middle portion in the longitudinal direction of the tail portion 102. The guide surface 110 is curved in such a way as to overhand or project out toward the tail portion 102 side in such a way as to follow the other width direction end of the tail portion 102, which is curved in a concave shape, and is in contact with (abuts) the other width direction end of the tail portion 102.

The movement of the tail portion 102, that is, the lock pawl 80, is restricted as a result of the guide surfaces 108 and 110 being in contact with the width direction end portions of the tail portion 102.

Figure 5:
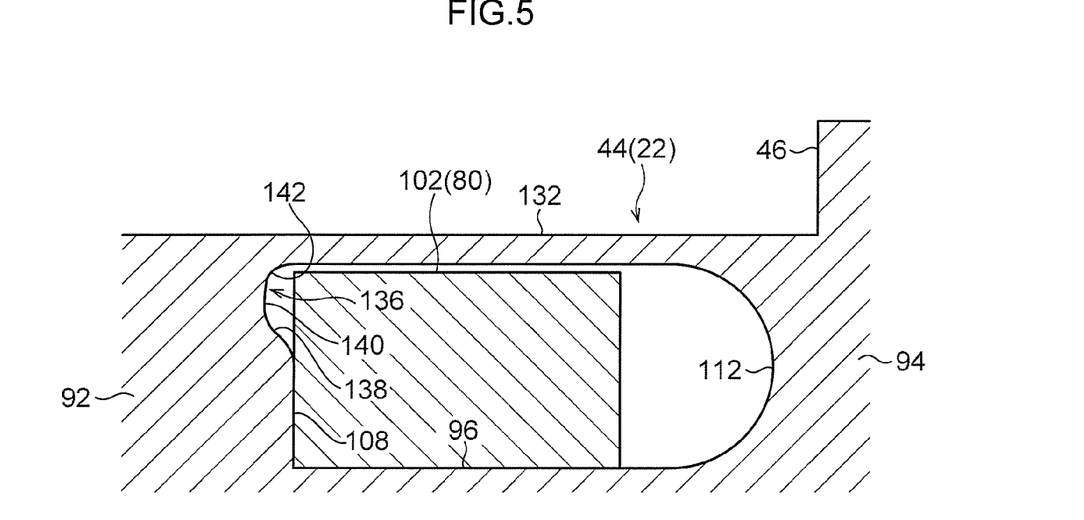
FIG. 5 is a cross-sectional view of the lock base and a lock pawl showing the configurations of a recessed portion and a curved surface.

Furthermore, a portion of the side portion 94, which portion is further toward the distal end side of the tail portion 102 than the guide surface 110, is formed in such a way as to be spaced apart from the other width direction end of the tail portion 102. As shown in FIG. 5, the surface of this portion facing the other width direction end of the tail portion 102 is a curved surface 112 that is curved in a concave shape toward the tail portion 102 side. Furthermore, as shown in FIG. 2 and FIG. 4, the portion of the side portion 94 where the curved surface 112 is formed is formed in such a way as to include a formation position which is further toward the side portion 92 side than the shaft portion 46 of the spool 22 (i.e., a portion the lock base 44 side of the shaft portion 46). For this reason, the flange portion 42 (and the spool body 24) and the shaft portion 46 are continuously interconnected in the axial direction by the side portion 94. For this reason, the pawl housing groove 96 is formed in such a way as to avoid (go by around) the position where the shaft portion 46 is formed in the lock base 44.

As shown in FIG. 4, a portion of the side portion 94, which portion is further toward the tail portion 102 distal end side than the curved surface 112, is a head portion abut (contact) portion 114. In a state in which the lock pawl 80 is housed in the pawl housing groove 96, a portion which is at the side portion 94 side of the outer peripheral portion of the head portion 104 is in contact with (abuts) the head portion contact portion 114. Due to this also, the movement of the lock pawl 80 in the pawl housing groove 96 is restricted.

Furthermore, a guide projection 116 that projects toward the V gear 56 side is formed on the head portion 104 of the lock pawl 80. A guide hole 118 (see FIG. 2 and FIG. 3) is formed in the V gear 56 in correspondence to the guide projection 116. The guide hole 118 is formed in the shape of a long hole that is appropriately curved or bent in its lengthwise direction middle portion, and the distal end side of the guide projection 116 is inserted in the guide hole 118. When the spool 22 rotates in the pull-out direction relatively with respect to the V gear 56, the guide projection 116 presses the inner peripheral portion of the guide hole 118.

Figure 3:
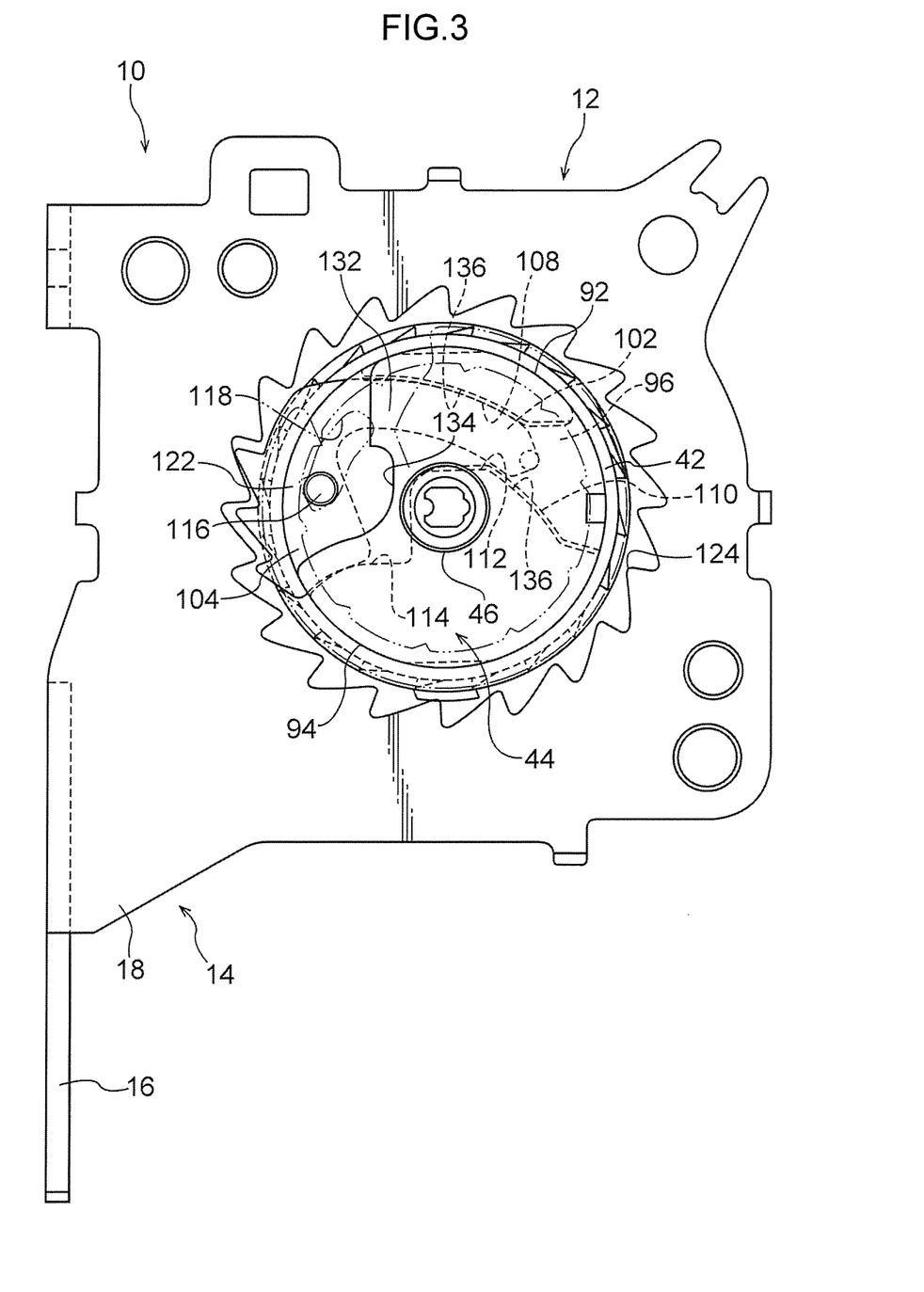
FIG. 3 is a side view, corresponding to FIG. 2, showing a state in which a lock pawl is engaged with ratchet teeth of a ratchet hole.

The guide projection 116 is guided in the lengthwise direction of the guide hole 118 by the pressing reaction force that the guide projection 116 receives from the inner peripheral portion of the guide hole 118 at this time. Moreover, the lock pawl 80 moves in such a way that the head portion 104 of the lock pawl 80 moves so as to project from the pawl housing groove 96 outward in the radial direction of rotation of the spool 22 as a result of the tail portion 102 of the lock pawl 80 being guided on the guide surfaces 108 and 110 of the side portions 92 and 94 at this time.

Furthermore, as shown in FIG. 2 and FIG. 4, plural (in the present embodiment, three) ratchet teeth 122 are formed on the surface of the outer peripheral portion of the head portion 104 of the lock pawl 80 that faces outward in the radial direction of the spool 22. An inner-toothed ratchet hole 124 is formed in the leg plate 18 of the frame 14 in such a way as to face the ratchet teeth 122. When the lock pawl 80 moves in such a way that the head portion 104 projects outward in the radial direction of rotation of the spool 22 as described above, the ratchet teeth 122 of the head portion 104 mesh with the ratchet teeth of the ratchet hole 124 as shown in FIG. 3.

In this state, the lock pawl 80 cannot rotate in the pull-out direction about the central axis of the spool body 24. Moreover, in this state, the tail portion 102 of the lock pawl 80 is in contact with the guide surfaces 108 and 110 of the side portions 92 and 94, and the lock pawl 80 receives the load when the spool 22 tries to rotate in the pull-out direction. Due to this, the rotation of the spool 22 in the pull-out direction on the leg plate 18 side is regulated.

Furthermore, as shown in FIG. 2 and FIG. 4, a close-off portion 132 is formed in the lock base 44, and the pawl housing groove 96 is closed off from the side opposite the flange portion 42 side by the close-off portion 132. A cut-out portion 134 is formed (exists) in the close-off portion 132 in correspondence to the head portion 104 of the lock pawl 80. The guide projection 116 passes through the cut-out portion 134.

Furthermore, the cut-out portion 134 is formed in such a way as to face (oppose), in the axial direction of the spool 22, a second located ratchet tooth from the take-up direction side and a ratchet tooth (teeth) located further toward the other side (the pull out direction side) than the second located ratchet tooth, among the plurality of ratchet teeth of the lock pawl in a state in which the lock pawl 80 is housed in the pawl housing groove 96. For this reason, in a state in which the lock pawl 80 is housed in the pawl housing groove 96, the close-off portion 132 is not formed in a position facing (opposing) the second located ratchet tooth from the take-up direction side and the ratchet tooth (teeth) located further toward the other side than the second located ratchet tooth. The close-off portion 132 faces (opposes) the head portion 104 in a portion of the head portion 104 which portion includes a ratchet tooth 122 located at the most on the take-up direction side and includes a portion further than this ratchet tooth 122 toward the take-up direction side.

Moreover, recessed (concave) portions 136 are formed in portions corresponding to the guide surfaces 108 and 110 in connected portions where the close-off portion 132 and the side portions 92 and 94 are interconnected. As shown in FIG. 5, each recessed portion 136 is formed in a recessed (concave) shape that opens toward the tail portion 102 side. The recessed portion 136 has a sloping portion 138 that gradually displaces (slopes) outward in the open width direction of the pawl housing groove 96 toward the close-off portion 132 side. A flat portion 140 is formed continuously from an end portion on the close-off portion 132 side of the sloping portion 138. The flat portion 140 is directed (faces) inward in the open width direction of the pawl housing groove 96, and a curved surface 142 is formed continuously from an end portion of the flat portion 140 on the side opposite the sloping portion 138 side. The curved surface 142 is curved such that, a point inward side in the open width direction of the pawl housing groove 96 and the bottom portion side of the pawl housing groove 96 (the side opposite the close-off portion 132 side) is as its center of curvature, and the curved surface 142 is connected to the close-off portion 132 at its end portion on the side opposite the flat portion 140 side.

In the present embodiment, the recessed portions 136 have a substantially fan-like shape configured by the sloping portion 138, the flat portion 140, and the curved surface 142, but the configuration of the recessed portions 136 is not limited to this shape.

<Operation and Effects of Present Embodiment>

Next, the operation and effects of the present embodiment will be described.

In the webbing take-up device 10, the VSIR mechanism is actuated on the basis of the acceleration of the vehicle at a time when there is a sudden deceleration of the vehicle, and when the rotational acceleration of the spool 22 in the pull-out direction becomes equal to or greater than a predetermined magnitude, the WSIR mechanism is actuated.

When the vehicle rapidly decelerates, the ball 76 of the acceleration sensor 70 rolls on the concave surface 74 of the sensor housing 72. When, due to this, the ball 76 rises on the sloping surface of the concave surface 74, the ball 76 pushes the sensor lever 78 upward. The sensor lever 78 pushed by the ball 76 rotates upward and the distal end of the sensor lever 78 meshes with the ratchet teeth formed on the outer peripheral portion of the V gear 56. Due to this, the rotation of the V gear 56 in the pull-out direction is regulated.

Meanwhile, for example, when the vehicle decelerates, the body of the occupant seated in the seat of the vehicle tries to move toward the vehicle front side due to inertia, whereby the webbing 26 is pulled and the spool 22 rotates in the pull-out direction. If the rotational acceleration, in the pull-out direction, of the V gear 56 rotating following the spool 22 rotating in the pull-out direction at this time is a predetermined magnitude, the W pawl 62 provided at the V gear 56 swings relatively with respect to the V gear 56, whereby the distal end of the W pawl 62 meshes with the ratchet teeth provided on the inside of the sensor holder 54. Due to this, the rotation of the V gear 56 in the pull-out direction is regulated.

Ordinarily, when the spool 22 rotates in the pull-out direction, the V gear 56 is caused by the compression coil spring 58 to rotate in such a way as to follow the spool 22, but when the spool 22 rotates in the pull-out direction in the state in which the rotation of the V gear 56 in the pull-out direction is regulated as described above, the spool 22 relatively rotates in the pull-out direction with respect to the V gear 56 while compressing and deforming the compression coil spring 58. When this relative rotation of the spool 22 in the pull-out direction with respect to the V gear 56 occurs, the guide projection 116 of the lock pawl 80 entered in the guide hole 118 in the V gear 56 presses the inner peripheral portion of the guide hole 118.

The guide projection 116 is guided in the lengthwise direction of the guide hole 118 by the pressing reaction force that the guide projection 116 receives from the inner peripheral portion of the guide hole 118 at this time. Moreover, at this time, the tail portion 102 of the lock pawl 80 is guided on the guide surfaces 108 and 110 of the side portions 92 and 94, and the head portion 104 is guided on the head portion contact portion 114. Moreover, in this state, the section of the head portion 104 that includes the ratchet tooth 122 located most on the take-up direction side and the take-up direction side of this ratchet tooth 122 opposes the close-off portion 132. Due to this, the head portion 104 does not move in such as the open direction of the pawl housing groove 96, and the lock pawl 80 moves in a lock direction in such a way that the head portion 104 of the lock pawl 80 projects from the pawl housing groove 96 outward in the radial direction of rotation of the spool 22.

As for the lock pawl 80 whose head portion 104 projects from the pawl housing groove 96, the ratchet teeth 122 formed on the head portion 104 mesh with the ratchet teeth of the ratchet hole 124 formed in the leg plate 18 of the frame 14. Due to this, the rotation of the lock pawl 80 in the pull-out direction about the central axis of the spool body 24 is regulated. Moreover, in this state, the tail portion 102 of the lock pawl 80 is in contact with the guide surfaces 108 and 110 of the side portions 92 and 94, and the lock pawl 80 receives the load when the spool 22 tries to rotate in the pull-out direction. Du to this, the rotation of the spool 22 in the pull-out direction is regulated and the pulling-out of the webbing 26 from the spool 22 is regulated. Due to that the pulling-out of the webbing 26 from the spool 22 is regulated in this way, the body of the occupant can be effectively restrained by the webbing 26 at a time when there is a sudden deceleration of the vehicle.

When the spool 22 tries to rotate in the pull-out direction in the state in which the ratchet teeth 122 of the lock pawl 80 are meshed with the ratchet teeth of the ratchet hole 124 as described above, due to the pressing reaction force from the ratchet teeth of the ratchet hole 124, the lock pawl 80 tries to displace (move) in such a way that the head portion 104, particularly the pull-out direction side portion of the head portion 104, moves away from the spool body 24.

Here, the cut-out portion 134 is formed (present) in the close-off portion 132 that closes off the pawl housing groove 96 from the side opposite the spool body 24 side. Due to that the cut-out portion 134 is formed in the close-off portion 132, the close-off portion 132 is not formed in a position facing (opposing) the second located ratchet tooth from the take-up direction side and the ratchet tooth (teeth) located further toward the other side than the second located ratchet tooth in a state in which the lock pawl 80 is housed in the pawl housing groove 96. For this reason, even when, due to the pressing reaction force from the ratchet teeth of the ratchet hole 124, the head portion 104 of the lock pawl 80, particularly the pull-out direction side portion of the head portion 104, shifts position in such a way as to move away from the spool body 24, the head portion 104 does not come into contact with the close-off portion 132 or, even if the head portion 104 comes into contact with the close-off portion 132, the force with which the head portion 104 presses the close-off portion 132 becomes smaller.

Furthermore, the guide surfaces 108 and 110 have the function of contacting the tail portion 102 of the lock pawl 80 and guiding the lock pawl 80. Here, the recessed portions 136 are formed, between the close-off portion 132, in the ranges in which the guide surfaces 108 and 110 are set in the side portions 92 and 94. For this reason, even if the lock pawl 80 presses the close-off portion 132 in the ranges in which the guide surfaces 108 and 110 are set in the side portions 92 and 94, the pressing force is dispersed in the curved surface 142 of the recessed portion 136. For this reason, the pressing force from the lock pawl 80 can be dispersed, without allowing it to concentrate, in the portions where the side portions 92 and 94 and the close-off portion 132 are connected without impairing the function of guiding the lock pawl 80 and the function of receiving the reaction force when the lock pawl 80 has received the load when the spool 22 tries to rotate in the pull-out direction.

Moreover, the portion of the side portion 94, which portion is further toward the distal end side of the tail portion 102 than the guide surface 110, is spaced apart from the other width direction end of the tail portion 102, and this portion does not have the function of guiding the lock pawl 80. Here, the surface of this portion opposing the other width direction end of the tail portion 102 is the curved surface 112 that is curved in a concave shape toward the tail portion 102 side. For this reason, even if the lock pawl 80 presses the close-off portion 132, the pressing force can be dispersed, without allowing it to concentrate, in the corner portion of the portion where the side portion 94 and the close-off portion 132 are interconnected in this portion.

Furthermore, as described above, the close-off portion 132 is not formed in a region of the second located ratchet tooth from the take-up direction side and the ratchet tooth (teeth) located further toward the other (opposite) side than the second located ratchet tooth, but the close-off portion 132 opposes the head portion 104 in the portion that is at the ratchet tooth 122 located most on the take-up direction side and at the portion further toward the take-up direction side than this ratchet tooth 122. For this reason, the head portion 104 of the lock pawl 80 can be prevented from displacing in a direction away from the spool body 24 in a state in which the lock pawl 80 is housed in the pawl housing groove 96. Due to this, the ratchet teeth 122 of the lock pawl 80 can mesh well with the ratchet teeth of the ratchet hole 124.

Moreover, in the present embodiment, the pawl housing groove 96 is formed in such a way as to avoid the position where the shaft portion 46 of the spool 22 is formed. For this reason, the shaft portion 46 is continuous with the spool body 24 in the central axis direction via the side portion 94 and the flange portion 42. For this reason, the mechanical strength of the shaft portion 46 can be improved.

What is claimed is:

1. A webbing take-up device, comprising:
  a frame at which is formed a ratchet hole having inner ratchet teeth;
  a spool that has a spool body that takes up a webbing by rotating in a take-up direction;
  a lock pawl that is provided at a lateral side of the spool body in an axial direction of the spool and that has a head portion at which are formed a plurality of outer ratchet teeth corresponding to the ratchet teeth of the ratchet hole and a tail portion that extends from a pull-out direction side of the head portion;
  a lock base that is formed at the spool at the lateral side of the spool body in the axial direction and at which is formed a pawl housing groove that houses the lock pawl inside the pawl housing groove and opens at a head portion side at an outer peripheral portion of the lock base;
  a sensor mechanism that, by being actuated, causes the lock pawl to move in a lock direction so that the ratchet teeth of the head portion mesh with the ratchet teeth of the ratchet hole to thereby regulate rotation of the spool in the pull-out direction; and
  a close-off portion that closes off the pawl housing groove from a side of the lock base opposite to the spool body side,
  an abut surface that is set at an inside surface of the pawl housing groove that abuts a portion of a side surface of the lock pawl, which portion is further than a middle portion in the axial direction toward the spool body side, in a state in which the ratchet teeth of the lock pawl are meshed with the ratchet teeth of the ratchet hole, that imparts a rotational force of the spool in the pull-out direction to the lock pawl, and that receives a reaction force corresponding to the rotational force; and
  a recessed portion that is formed between the abut surface and the close-off portion and that is formed in a recessed shape that opens inward in an open width direction of the pawl housing groove, the recessed portion having a curved surface that is curved so as to open inward in the open width direction of the pawl housing groove.

2. The webbing take-up device of claim 1, wherein:
  the close-off portion is formed so as to face, in the axial direction, a vicinity of an end portion at the take-up direction side of the head portion,
  an inner wall at the take-up direction side of the pawl housing groove is formed so as to be able to abut the lock pawl, and
  the close-off portion facing the vicinity of the end portion at the take-up direction side of the head portion and the inner wall at the take-up direction side of the pawl housing groove abut the lock pawl and guide the lock pawl in the lock direction.

3. The webbing take-up device of claim 2, wherein a shaft portion is formed at the lock base, coaxially with the spool body, from the side of the lock base opposite to the spool body side, and the pawl housing groove is curved so as to avoid a region in which the shaft portion is formed.

4. The webbing take-up device of claim 1, wherein a shaft portion is formed at the lock base, coaxially with the spool body, from the side of the lock base opposite to the spool body side, and the pawl housing groove is curved so as to avoid a region in which the shaft portion is formed.

5. The webbing take-up device of claim 1, wherein at least a part of a guide surface that guides the lock pawl in the lock direction when the sensor mechanism is actuated is used as the abut surface.

* * * * *